June 1, 1948.   E. A. STIENEN   2,442,553
VALVE
Filed Jan. 23, 1945

ERNEST A. STIENEN
INVENTOR.

BY John P. Wilsonow
ATTORNEY

Patented June 1, 1948

2,442,553

UNITED STATES PATENT OFFICE 2,442,553

VALVE

Ernest A. Stienen, Peekskill, N. Y.

Application January 23, 1945, Serial No. 574,097

6 Claims. (Cl. 251—104)

My invention relates to valves and has particular reference to four way valves for connecting four pipes in different combinations.

My invention has for its object to provide a valve which can be operated manually or automatically for changing connections between four pipes in any desired manner, with additional control of two more pipes, so that it actually is a six-way valve. More particularly, I provide a valve which can be used in connection with a pump supplying a liquid for circulation through pipes or conduits forming a closed circuit, the valve being arranged to reverse the direction of the circulation of the liquid. My valve is particularly suitable for circulating a dye through a package of fabric, periodically alternating the flow of the dye in a direction from the inside of the package to the outside, and from the outside to the inside, thereby uniformly dyeing the package throughout its thickness. The same procedure is repeated for washing out the dye by clear water.

Another object of my invention is to provide a light, compact and inexpensive valve made or fabricated of sheet metal by welding or brazing without the use of any castings.

Another object of my invention is to provide a four-six way valve to be used with a pump for circulating a liquid in a closed circuit, means being provided for admitting fresh liquid through the valve into the circuit, and for draining the spent liquid upon completion of the circulating operation.

Still another object of my invention is to provide a valve in which the pressure of the liquid on the movable part is balanced so that relatively little power is required for turning the valve.

My invention is more fully described in the accompanying specification and drawings in which.

Figure 1:
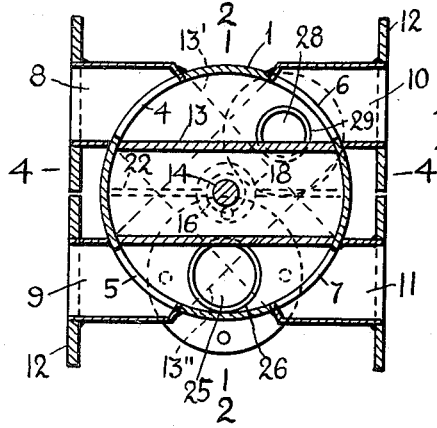
Fig. 1 is a sectional elevational view of my valve.
Figure 2:
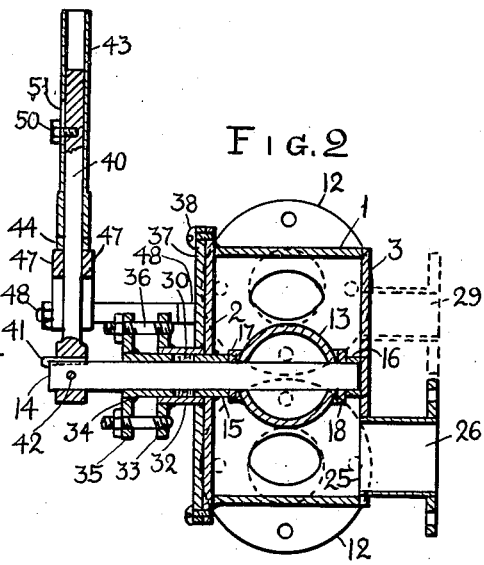
Fig. 2 is a sectional view taken on the line 2—2 of Fig. 1.
Figure 3:
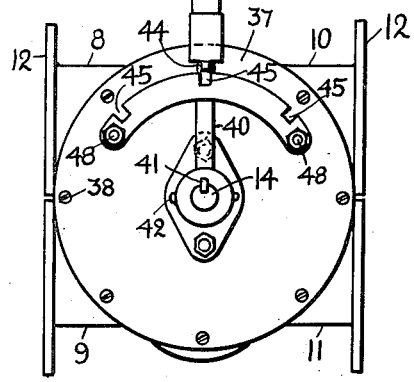
Fig. 3 is a front end view of the valve.
Figure 4:
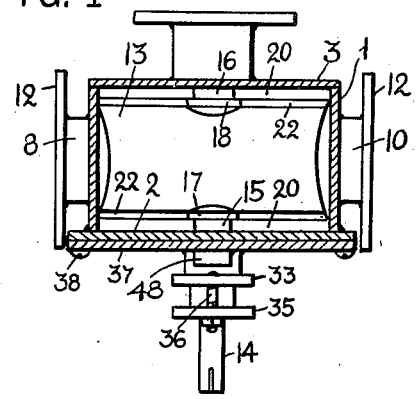
Fig. 4 is a sectional view taken on the line 4—4 of Fig. 1.

My valve consists of a tubular casing 1 made of sheet metal welded at the seam and provided with a front end plate 2 and a rear end plate 3. The casing is provided with four openings or ports 4, 5, 6 and 7. Short pipes or similar tubular members 8, 9, 10 and 11 are attached to the casing 1 over the ports as by welding or a similar method. The pipes are provided with flanges 12 for attaching to corresponding flanges of circulation pipes. Thus, for instance, the pipe 10 may be connected to the intake of a pump (not shown), pipe 11 to the outlet of the pump, pipe 8 to one end of a receptacle for a liquid, and the pipe 9 to the other end of the receptacle.

For changing the connections between the pipes, a rotary valve member or "butterfly" 13 is provided in the casing 1. The valve member 13 is made of a piece of sheet metal bent into a tubular form and welded at the seam. The ends of the tubular member are trimmed to slidably engage the inner surface of the casing so that the tubular member can form a connecting duct between opposing ports in the casing. The tubular member is mounted for this purpose on a shaft 14, journaled in tubular bearings 15 and 16 extending from the end walls or plates 2 and 3. The shaft 14 is welded to the walls of the valve member, and the joint is reinforced by end discs or washers 17, 18, frictionally engaging the ends of the bearings 15, 16. Sealing strips or ribs 20 are welded to the end plates 2, 3, extending from the bearings 15, 16 in a direction parallel to the axis of the pipes 8, 10 and 9, 11, and flush with the edges of the bearings 15, 16. The valve tube 13 is provided with similar ribs or strips 22, extending from the discs 17, 18, the edges of the bars 22 being flush with the surfaces of the discs 17, 18. The strips or ribs 20 register with the bars 22 when the tubular valve member 13 is placed in a position parallel to the tubes 8, 10 and 9, 11 as shown in Fig. 1, thereby sealing the upper half of the casing 1 from the lower half and establishing a direct communication between the tubes 8, 10 in the upper portion of the casing, and between the tubes 9, 11 in the lower portion of the casing, the circulation of the pump being then directed through the port 9, returning into the pump through the port 8. By turning the tubular valve member 13 into a position 13' as shown in dotted lines in Fig. 1, a communication is established through the tubular valve member 13 between the pipe 11 (outlet for the pump, for instance) and pipe 8, and another communication, around the tubular valve member 13, between the outlet pipe 10 and the pipe 9. The direction of circulation through the receptacle will be thereby reversed. The tubular valve 13 can be also placed in a position 13'' as shown in dotted lines in Fig. 1 for establishing direct connection through the tubular valve member 13 between the pipe 10 and pipe 9, the pipe 11 being then connected with the pipe 8 around the tubular member 13. My valve is particularly adapted for circulating a dye solution through a receptacle with goods to be dyed, periodic reversals of the direction of circulation insuring a uniform coloring of the product.

For removing the dyeing solution from the receptacle with the dyed goods, the casing 1 is provided with a drain port 25 from which extends a short pipe 26 to be connected to a drain pipe with a valve (not shown), the valve being closed during the time when the dye solution is being circulated.

Another port 28 is provided in the upper portion of the casing 1 with a short pipe 29 for rinsing the receptacle by a fresh water delivered by the pump. The water after using is discharged through the port 28.

The valve member 13 is then placed in a horizontal position as shown in Fig. 1 in full lines, separating the upper and the lower portions of the casing 1. By opening the valves for the ports 25 and 28, the fresh water will be circulated by the pump through the receptacle with the goods and drained through the port 25. The intake of the pump may be for this purpose connected to the pipe 11.

The shaft 14 extends outside from the bearing 15 through a packing 30 formed in a tubular extension 32 with a flange 33, to which is attached a tubular gland 34 with a flange 35 by means of studs 36. The tubular extension is attached to a disc-shaped plate 37 secured to the end plate 2 as by screws 38. A handle 40 is mounted on the outer end of the shaft 14 and is secured by a key 41 and a pin 42. A sleeve 43 is slidably fitted on the handle 40 and is provided with a tooth 44 at the lower end for notches or recesses 45 in arcuate bars 47 supported by studs 48 on bosses 49, extending from the front end plate 2 of the casing 1. The notches 45, 46 are so located as to make it possible to lock the tubular valve member 13 in one of its operating positions.

For automatic operation of the valve, the handle 40 may be connected to a suitable automatic controlling or operating device, in which case the sleeve 43 is raised and locked in the raised position by a screw 50 threaded into the handle 40 and passing through a vertical slot 51 in the sleeve 43.

One of the important advantages of my valve is that, because of its particular tubular construction, pressure on the movable part or butterfly 13 is always balanced so that very little power is required to operate the valve. Thus it is possible to reverse the valve while the pump is in operation, while with ordinary butterfly valves it is necessary to shut down the pump before the valve can be turned. Another advantage of my construction resides in the provision for sealing the upper portion of the valve chamber from the lower portion by the use of relatively narrow ribs on the butterfly, thereby reducing the pressure differential at both sides of the butterfly portion when the latter is placed in a position shown in full lines in Fig. 1.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A valve comprising a tubular cylindrical casing having two pairs of ports in its peripheral wall, the ports in each pair being diametrically opposite each other; short pipes extending from the ports; substantially flat end walls attached to the ends of the casing; a shaft supported in the end walls concentrically to the casing; tubular bearings for the shaft; a tubular valve member mounted on the shaft on the casing, the ends of the tubular valve member being rounded concentrically to the shaft for slidably engaging the inside surface of the casing, the inner diameter of the valve member corresponding to the diameters of the ports; the valve member being arranged to be rotated by the shaft for forming a communication between the opposite ports; round washers attached to the valve member around the shaft frictionally engaging the inner ends of the tubular bearings; ribs attached to the end walls extending from the bearings to the casing; and outer ribs attached to the valve member extending from the round washers to the ends of the valve member, the valve member ribs being arranged to register with the end wall ribs when the valve member is placed in a neutral position between the adjacent ports, thereby sealing the space above the valve member from the space below the valve member.

2. A valve comprising a cylindrical tubular casing having a plurality of pairs of ports spaced peripherally at approximately equal distances apart, the ports in each pair being positioned diametrically opposite each other; end walls attached to the ends of the casing; a shaft rotatively supported in the end walls concentrically with the casing; a tubular valve member fixed on the shaft transversely thereof, the ends of the tubular valve member being rounded to slidably engage the inner surface of the casing, the diameter of the inner opening in the valve member corresponding to the diameter of the ports, the valve member being thereby adapted to establish communication between the opposite ports of each pair; and a handle on the outer end of the shaft for rotating the shaft with the valve member, the distance between the end walls being greater than the diameter of the tubular body of the valve member, a clearance being thereby formed between the valve member and the end walls for equalizing the pressure of the liquid on the valve member when the valve is in the one of its operative positions and ribs extending from the end walls adapted to engage the valve when the latter is in its inoperative position and separating the ports at one side of the valve from the ports at the other side of the valve.

3. A valve comprising a cylindrical tubular casing having two pairs of ports spaced peripherally at approximately equal distances apart, the ports in each pair being positioned diametrically opposite each other; end walls attached to the ends of the casing; a shaft rotatively supported in the end walls concentrically with the casing; a tubular valve member fixed on the shaft transversely thereof, the ends of the tubular valve member being rounded to slidably engage the inner surface of the casing, the diameter of the inner opening in the valve member corresponding to the diameter of the ports, the valve member being thereby adapted to establish communication between the opposite ports of each pair; a handle on the outer end of the shaft for rotating the shaft with the valve member, the distance between the end walls being greater than the diameter of the tubular body of the valve member, a clearance being thereby formed between the valve member and the end walls, establishing communication between the ports of one pair when the valve connects the ports of the other pair, the pressure of the liquid on the valve member being thereby balanced when the valve is in one of its operative positions; and means including a pair of diametrically opposed strips on said valve member in registry with a pair of opposed strips on said end walls to close the clearance between the valve member and the end walls when the valve member is placed in a position intermediate of the four ports.

4. A valve comprising a tubular cylindrical casing having two pairs of ports in its peripheral wall, the ports in each pair being diametrically opposite each other; short pipes extending from the ports; end walls attached to the ends of the casing; a shaft supported in the end walls concentrically to the casing; tubular bearings for the shaft; a straight tubular valve member mounted on the shaft in the casing, the ends of the tubular valve member being rounded concentrically to the shaft for slidably engaging the inside surface of the casing, the inner diameter of the valve member corresponding to the diameters of the ports, the outer diameter of the valve member being substantially smaller than the distance between the end walls, the valve member being arranged to be rotated by the shaft for forming a communication between the opposite ports of one pair through the valve while establishing communication between the ports of the other pair around the valve member; and ribs extending from the end walls longitudinally of the valve member in the plane of the axis of the valve member arranged to engage the valve member for sealing the spaces at either side of the valve member from each other when the valve member is placed in a position intermediate of the ports of each pair, thereby establishing communication between the adjacent ports of different pairs at each side of the valve member.

5. A valve comprising a tubular cylindrical casing having two pairs of ports in its peripheral wall, the ports in each pair being diametrically opposite each other; short pipes extending from the ports; end walls attached to the ends of the casing; a shaft supported in the end walls concentrically to the casing; tubular bearings for the shaft; a straight tubular valve member mounted on the shaft in the casing, the ends of the tubular valve member being rounded concentrically to the shaft for slidably engaging the inside surface of the casing, the inner diameter of the valve member corresponding to the diameters of the ports, the outer diameter of the valve member being substantially smaller than the distance between the end walls, the valve member being arranged to be rotated by the shaft for forming a communication between the opposite ports of one pair through the valve while establishing communication between the ports of the other pair around the valve member; and ribs extending from the end walls longitudinally of the valve member in the plane of the axis of the valve member arranged to engage the valve member for sealing the spaces at either side of the valve member from each other when the valve member is placed in a position intermediate of the ports of each pair, thereby establishing communication between the adjacent ports of different pairs at each side of the valve member, the end walls having drain openings at either side of the valve member when the valve member is placed in said intermediate position.

6. A valve comprising a tubular cylindrical casing having two pairs of ports in its peripheral wall, the ports in each pair being diametrically opposite each other; short pipes extending from the ports; substantially flat end walls attached to the ends of the casing; a shaft supported in the end walls concentrically to the casing; tubular bearings for the shaft; a tubular valve member mounted on the shaft in the casing, the ends of the tubular valve member being rounded concentrically to the shaft for slidably engaging the inside surface of the casing, the inner diameter of the valve member corresponding to the diameters of the ports, the outer diameter of the valve member being substantially smaller than the distance between the end walls, the valve member being arranged to be rotated by the shaft for forming a communication between the opposite ports and for placing the valve in an intermediate position in which the ports of each pair are separated; inner ribs extending from the end walls of the casing arranged to engage the valve member when the valve member is placed in the intermediate position between the ports, the upper and the lower portions of the casing being thereby separated from each other by the valve; and means to releasably lock the valve member in one of its operative positions or in its intermediate position.

ERNEST A. STIENEN.

REFERENCES CITED

The following references are of record in the file of this patent:

UNITED STATES PATENTS

| Number | Name | Date |
|---|---|---|
| 779,889 | Todd | Jan. 10, 1905 |
| 2,008,248 | Fluck | July 16, 1935 |
| 2,040,268 | Orton | May 12, 1936 |
| 2,081,464 | Stewart | May 25, 1937 |

OTHER REFERENCES

A. P. C. appln. of Ohno, Ser. No. 368,491, pub. May 25, 1943.